(12) United States Patent
Dubois

(10) Patent No.: US 7,287,365 B2
(45) Date of Patent: Oct. 30, 2007

(54) BALER

(75) Inventor: Jean-Yves Dubois, Cresancey (FR)

(73) Assignee: Deere & Company, Moline, IL (US)

( * ) Notice: Subject to any disclaimer, the term of this patent is extended or adjusted under 35 U.S.C. 154(b) by 39 days.

(21) Appl. No.: 11/298,394

(22) Filed: Dec. 8, 2005

(65) Prior Publication Data

US 2006/0124002 A1   Jun. 15, 2006

Related U.S. Application Data

(63) Continuation-in-part of application No. 11/177,511, filed on Jul. 8, 2005.

(51) Int. Cl.
*A01D 39/00* (2006.01)
*A01D 43/02* (2006.01)
*A01D 75/00* (2006.01)

(52) U.S. Cl. ............................... 56/341; 100/88
(58) Field of Classification Search ............... 56/341, 56/432–446; 100/50
See application file for complete search history.

(56) References Cited

U.S. PATENT DOCUMENTS

| | | | |
|---|---|---|---|
| 4,106,267 A | | 8/1978 | White et al. |
| 4,106,268 A | | 8/1978 | White et al. |
| 4,135,444 A | * | 1/1979 | White et al. ............ 100/50 |
| 5,950,410 A | * | 9/1999 | O'Brien et al. ............ 56/341 |
| 2001/0042362 A1 | * | 11/2001 | Scarlett et al. ............ 56/10.2 G |
| 2002/0174781 A1 | * | 11/2002 | Leupe et al. ............ 100/88 |
| 2003/0106299 A1 | * | 6/2003 | Vogt et al. ............ 56/341 |

FOREIGN PATENT DOCUMENTS

| | | |
|---|---|---|
| DE | 38 11 649 | 6/1989 |
| DE | 43 12 991 | 10/1994 |
| DE | 103 60 598 | 7/2005 |
| EP | 0 223 351 | 5/1987 |
| FR | 2 747 007 | 10/1997 |
| FR | 2 863 821 | 6/2005 |

* cited by examiner

*Primary Examiner*—Árpád Fábián Kovács

(57) ABSTRACT

A baler with a rectangular baling chamber and in which a baling piston is accommodated. A supply channel with a supply arrangement for the conveying and compressing of crop in the supply channel and for bringing the compressed harvested crop into the baling chamber and with a sensor arrangement for the determination of the loading on at least one component of the baler. The crop to be baled is precompressed in the supply channel by a compression fork before it is pushed into the baling chamber by a loading fork. The sensor arrangement is configured in such a way that it detects or can detect one or more values that represent the distribution of the harvested crop with respect to the width of the supply channel.

1 Claim, 2 Drawing Sheets

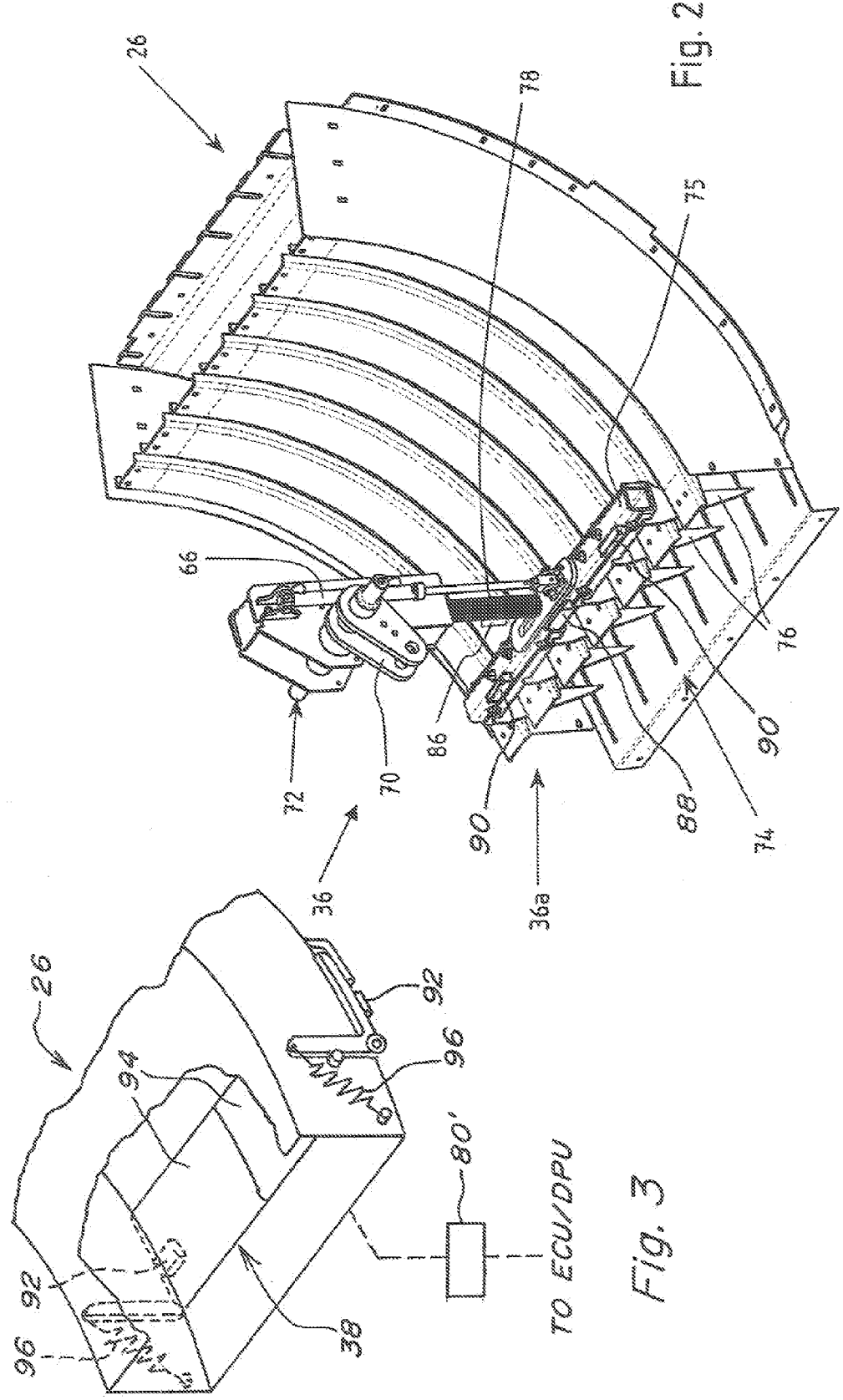

BALER

CROSS-REFERENCE TO RELATED APPLICATIONS

This application is a Continuation-in-Part of U.S. application Ser. No. 11/177,511 filed 8 Jul. 2005, which application is pending.

BACKGROUND

1. Field of Invention

This invention generally relates to a baler and, more particularly, to a baler having a sensor arrangement for determination of at least one value representing the throughput or distribution of harvested crop with regard to the width of the supply channel.

2. Related Technology

German Patent Reference No. DE A1 195 43 343 shows an agricultural baler for the production of large rectangular bales. This baler is provided with a weighing arrangement that weighs the finished bound bale of harvested crop. The baler is equipped with sensor technology for the determination of the relative loading value of the operating devices of the baler using strain gages, rotational speed sensors, pressure sensors or temperature sensors.

The general purpose of the present invention overcomes problems in the prior art by providing a baler delivering regularly formed bales. In the prior art, the supply of harvested crop to balers is frequently not optimal, therefore the balers routinely deliver irregularly formed bales.

SUMMARY

These and other objects and advantages of this invention will become apparent to a person of ordinary skill in this art upon careful reading of the detailed description of this including the drawings as presented herein.

The present invention discloses a baler having a rectangular baling chamber in which a movable baling piston is enclosed. A supply channel and a supply arrangement for the conveying and compressing of crop in the supply channel and for introducing the compressed harvested crop into the baling chamber, is also provided. A sensor arrangement for the detection of the loading of at least one component of the baler, wherein the sensor arrangement is configured in such a way that it determines one or more values which represent the distribution of the harvested crop with respect to the width of the supply channel to the baler or to the baling chamber.

Accordingly, the crop supplied to the baler can be altered by changing the operation of the baler or of the towing vehicle of the baler. Therefore, a more uniform harvested crop as well as a more uniform supply of harvested crop in the supply channel in the baling chamber of the baler can be achieved. Consequently, the bales formed in the baling chamber will be formed more uniformly or more homogeneously with respect to their width. An exemplary baler is an agricultural baler that can be particularly used for the production of large rectangular bales that can be coupled to a towing vehicle as well as configured as a self propelled machine.

A point wise loading of the supply arrangement can be determined using at least one pressure sensitive sensor. The sensor arrangement preferably will be provided with at least two pressure sensitive sensors that are spaced at a distance from each other so that the crop or the crop distribution relative to the width of the baler is represented by the difference of the values obtained. A torque sensor can detect a torque or a moment acting on the supply arrangement or one of its components. Alternatively, the torsion of the supply arrangement or one of its components or component groups can also be detected using a sensor.

A point wise loading of the supply arrangement can be determined using at least one pressure sensitive sensor. The sensor arrangement preferably will be provided with at least two pressure sensitive sensors that are spaced at a distance from each other so that the crop or the crop distribution relative to the width of the baler is represented by the difference of the values obtained. A torque sensor can detect a torque or a moment acting on the supply arrangement or one of its components. Alternative, the torsion of the supply arrangement or one of its components or component groups can also be detected using a sensor.

Depending on the direction of the torque, the value determined by the sensor can be an indicator of the distribution of the crop. However, the sensor arrangement preferably will be provided with at least two pressure sensors that are spaced at a distance from each other, so that the crop throughput or crop distribution relative to the width of the baler is represented by the difference of the values obtained. Alternatively, the value of the torque or moment can be an indicator of the distribution of the crop throughout in such a way that the torque rotates in the direction in which the supply arrangement is subject to a greater load and hence on which side a greater throughput passes through the supply arrangement or opposes its effect.

According to the illustration of one embodiment of the present invention, the supply arrangement is provided with a take up arrangement in the form of a pick up, a compression fork and a loading fork assembly. In the take-up arrangement, the compression fork and the loading fork assembly are driven hydraulically. Alternatively, the supply arrangement can be provided with individual components, groups of components, or additional groups of components, for example, in the form of conveyor rotors or cutting arrangements etc. Moreover, it is possible that all or some individual groups of components are driven by crank drives or in any other appropriate way.

The sensor can be provided on the take up arrangement, the compression fork and the loading fork assembly or on any other appropriate component of the supply arrangement. The sensor preferably takes up the torsional loading of one or more of the aforementioned components or groups of components. Alternatively, several pressure sensors can be spaced apart from each other. The differing values of the distribution of the crop can be assessed by the user.

The sensor can also detect the torque of a conveyor rotor, for example, one that extends transverse to the baler. Or alternatively the sensor can detect the direction of operation of the conveyor rotor such as the pick up or the take up arrangement, particularly if its drive is performed in an appropriate way. Preferably, the sensor detects a torque that occurs about the longitudinal axis of the loading fork. The loading fork assembly may be provided, for example, with a transverse carrier that carries tines or other similar conveying devices or other conveying means or another appropriate conveying device such as a rake like conveying arrangement that is attached to a generally elongated carrier. The carriers may, for example, be a pipe or a pipe profile or any other appropriate profile. The sensor may be provided on the carrier or profile and detect its torque about the longitudinal axis. But it is also conceivable that the sensor can be provided, for example, on the transverse carrier.

The sensor is provided preferably with at least one digital transmitter, particularly in the form of a strain gage, or is configured as such a device. The value determined, or made available by the sensor arrangement, the sensor or in particular, the digital transmitter, can be received by a control or regulating arrangement to be used as basis for regulating the processes by a data processing arrangement to be stored in memory, processed or transmitted further.

The regulating arrangement can regulate as a function of the value of one or more functions of the baler or a towing vehicle connected to the baler. This may, for example, be the operation of the supply arrangement as such as its conveying speed or a movement of the loading fork assembly, the compressing fork and the take up arrangement. The supply arrangement or, in particular, the take up arrangement can be provided in parts so that the conveying speed of individual sections can be determined as a function of the value. But, in particular, the direction of operation of the baler or the towing vehicle is controlled or regulated or affected as a function of the value, in order to equalize a non uniform supply of crop in this way and in order to better follow a mower swath with the use of an automatic positioning system, for example, based on a satellite supported positioning system. An optical means can be provided on the baler or the towing vehicle that, in particular, permits a visual equalization with the harvested crop arranged ahead of the towing vehicle or the baler or the material to be taken up. A provision can also be made for a warning arrangement to be activated when the value reaches a pre determined limit or exceeds it, or even that the baler itself or the towing vehicle, the supply arrangement, or individual components of the supply arrangement are stopped or slowed.

Alternatively, the data processing arrangement and the control can be connected to a display arrangement. The display arrangement can provide the operator with information regarding the flow of the crop or the quantity of crop taken up by the baler. Therefore, the operator can change the speed or general operation of the baler as needed. Other values detected by other sensor arrangements or other available information from other sources can also be utilized, for example, values from a position detection system to control the baler or towing vehicle. For this purpose, the display arrangement is arranged in a cab or on an operator's platform or at least in the vicinity or adjacent to an operator's seat or stand. The display arrangement can display the values determined or made available by a sensor arrangement, the sensor or the take up arrangement directly, in a processed, prepared of a graphic form.

A provision can also be made for a value to be displayed to an operator by means of a display arrangement. For example, a display can be provided on the baler, the towing vehicle or recorded in some other way in order to make possible to adjust the baler and an evaluation following an operating cycle. Direct influence of the baler as a function of the value becomes possible if the value is taken up or processed preferably by an electrical or electronic control or regulating arrangement that is provided on the baler or on a towing vehicle that is connected or that can be connected to the baler.

The supply channel may comprise means, which pivot freely as a function of harvested crop located in the supply channel. Such means can supply data about the fill level of the supply channel, which may then be used for example to control the function of the loading and compression forks. The means, however, can also interact independently from this or additionally with the sensor arrangement and/or the sensor/sensors and/or form a part of the same or the sensor/sensors. It is especially advantageous when the means are configured as a preferably spring-loaded flap or comprise such a flap, which extends substantially across the width of the supply channel. Such a flap may have a two- or multi-piece design, with the flap(s) being able to interact with a sensor or also to form such a sensor. If one of the flaps is pivoted less or more than the other flap or if a higher or lower loading is applied on the means by the harvested crop, then it may be concluded that in the area of this flap or this means more or less crop is present. If the means or the flap is pivoted evenly, then the crop is distributed evenly. This way the means or the flap may supply information about the distribution of the harvested crop with respect to the width of the supply channel and hence to the harvester, preferably by means of sensors.

BRIEF DESCRIPTION OF THE DRAWINGS

These and other features and advantages of the present invention will be better understood by reference to the following detailed description when considered in conjunction with the accompanying drawings. The drawings show an embodiment of the invention that shall be described in greater detail in the following.

FIG. 2 shows an enlarged view of a supply channel with a loading fork assembly; and FIG. 3 shows a perspective view of a bottom wall region of the supply channel containing two pivoted, spring loaded flaps.

DETAILED DESCRIPTION

Figure 1:
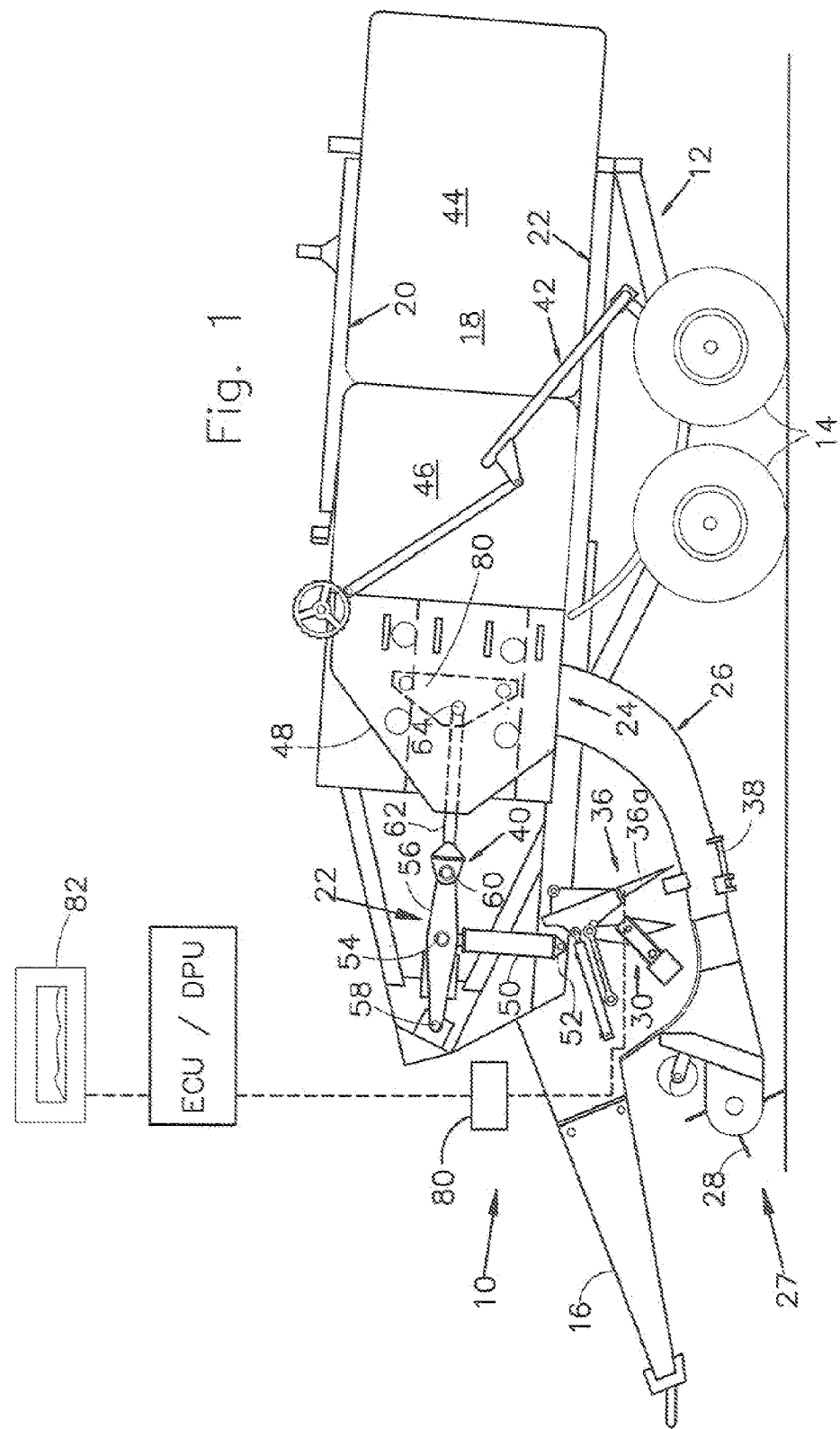
FIG. 1 shows a schematic side view of a baler according to the invention.

FIG. 1 shows a baler 10 for the production of rectangular bales, comprising a frame 12 which is supported by ground support wheels 14 in a tandem arrangement. A towbar 16 is connected to the frame 12 and extends from frame 12 to the front and is configured in such a way that it can be connected to a towing vehicle, such as an agricultural tractor, not shown, which is equipped with a power take off shaft in order to provide power for the drive of various driven components of the baler 10. A baling chamber 18 or a chamber of rectangular cross section is formed in part by an upper housing part 20 and a lower housing part 22. The lower housing part 22 further comprises a crop inlet 24, to which a curved supply channel 26 is connected that is used as a pre compression chamber as is described below. A supply arrangement 27 is provided with a take up arrangement 28, a compression fork 30 and a loading fork assembly 36. The take up arrangement 28, in the form of a pick up with a screw conveyor conveying towards the center, is arranged ahead of the supply channel 26 in order to raise a swath of harvested crop from the ground and to deliver it to the compression fork 30, which is used to compress harvested crop in the supply channel 26 until a load of predetermined density has been accumulated in the supply channel 26 and is pushed by means of a loading fork assembly 36 over the crop inlet 24 into the baling chamber 18. A spring loaded flap or a means 38 is mounted that can freely pivot at a lower forward point of the supply channel 26, that pivots as a function of the harvested crop located in the supply channel 26, and indicates that a desired density of the crop to be baled has been reached in the supply channel 26. Electrical current is provided to an electrical control circuit, which controls the corresponding drive connections that activate the loading fork assembly 36 such that the movement of the loading fork assembly 36 transports the load of harvested crop into the baling chamber 18.

When the load of harvested crop has been brought into the baling chamber 18, a piston mechanism 40 located ahead of the frame 12 is actuated in a controlled sequence after the loading fork assembly 36 in order to move the harvested crop to the rear into the baling chamber 18 where the harvested crop can be compressed in a stack. After the stack of compressed material has reached a predetermined length, a needle assembly 42 containing several curved needles, is actuated for the delivery of wrapping yarn. Knot tying devices (not shown) organize several strands of yarn such that the deposited lengths of yarn corresponds to the predetermined lengths of the stack forming bale 44 which is also ready for unloading. Unloading occurs when the bale is pushed out of the rear end region of the baling chamber 18 by a partial bale 46. The bale increases in length while new loads of harvested crop are pushed into the baling chamber 18.

FIG. 1 also illustrates the details of the piston mechanism 40. The piston mechanism 40 comprises a baling piston 48 that is arranged for a back and forth movement in the baling chamber 18 between a retracted position ahead of the crop inlet 24 and an extended position beyond the crop inlet 24. The movement of the baling piston 48 allows the loads of harvested crop disposed in the baling chamber 18 from the supply channel 26 to be compressed against a stack of harvested crop. The stack of harvested crop also includes a partially formed part of a bale 46 or the complete bale 44.

The piston mechanism 40 includes a drive 50 configured as an extensible and retractable actuating arrangement. As shown in FIG. 1, the drive 50 is a double acting hydraulic cylinder piston unit whose cylinder end is anchored with a pin 52 to the frame 12, free to pivot at a point above the compression fork 30. The piston end of the drive 50 is connected at a connecting point 54, perhaps with a pin, at a point between opposite ends of a first steering arm 56, used as a crank arm, whose forward end region is connected, free to pivot at a bearing location 58 to the frame 12. A rear end region of the first steering arm 56 is connected at a bearing location 60, perhaps with a pin to a forward end region of a second steering arm 62 operating as connection rod whose rear end region is connected at a bearing location 64 with the baling piston 48.

The connecting pins of the bearing locations 58, 64 are arranged along a line of centers or approximately along a central longitudinal axis of the baling chamber 18. The reaction force of the crop to be baled acting on the baling piston 48 is generally absorbed by the drive 50 when the first and the second steering arms 56, 62 are located along a line as shown when baling piston 48 is in it rear end position. Furthermore, it should be noted that the two steering arms 56, 62 could be configured as a pair of steering arms that are spaced at a distance from each other in the transverse direction. Then, the drive 50 would be connected at a connecting point 54 at a point between the pair of steering arms 56 that form the first steering arm 56. Therefore it should be recognized that the baling piston 48 forms the slider of a slider crank mechanism that contains a first steering arm 56 as crank arm and second steering arm 62 as connecting rod. Although the linkage formed by the steering arms 56, 62 does not move beyond a dead center position, it could be characterized as a toggle mechanism or a toggle linkage. Although the preferred embodiment shows a drive 50 that is connected on one side to the first steering arm 56 between opposite ends, the drive 50 moreover could be connected to any point between the bearing location 58 and the bearing location 64. For example, the drive 50 could be connected to the pin 60 or at a point along the length of the second steering arm 62, where then the operation would be better than the known arrangement in which the actuating arrangement is connected directly to the baling piston 48. An exemplary example of a baler is disclosed in U.S. Pat. No. 5,950,410, which is incorporated by reference herein. As an alternate to the special drive described with a hydraulic motor. A conventional crank drive could be used.

In FIG. 2, the supply channel 26 with the loading fork assembly 36 is shown in an enlarged view. The loading fork assembly 36 is provided with a loading fork 36a, a first hydraulic motor or a motor 66, that is able to move the loading fork 36a in the longitudinal direction and a second hydraulic motor or motor (not shown) that is connected with the loading fork assembly 36 over a lever 70 in such a way that the loading fork assembly 36 pivots upon a retraction or an extension of the motor 68 about a pivot axis 72.

The loading fork assembly 36 comprises a conveying element 74 in the form of a rake, that, includes a transverse carrier 75 and is equipped with tines 76 that intrude into the supply channel 26 in order to push pre compressed harvested crop from the supply channel 26 into the baling chamber 18. The loading fork 36a is also provided with a rod, a profile or a carrier 78 to which the conveying element 74 or the transverse carrier 75 is at least generally attached rigidly.

During operation the loading fork assembly 36 is activated when the harvested crop, that was pre compressed in the supply channel 26 by the compression fork 30, is pushed from the supply channel 26 into the baling chamber 18. This activation can, for example, be performed at regular time intervals or on the basis of a density of the harvested crop in the supply channel 26 detected by appropriate means 38 and as a function of other appropriate characteristic magnitudes.

If the loading fork assembly 36 is activated, then the first motor 66 moves the loading fork 36a in such a way that the tines 76 intrude into the supply channel 26 at a location facing away from the crop inlet 24. A second motor (not shown) engages the lever 70 and will pivot the loading fork assembly 36 upward in such a way that the tines 76 push the harvested crop located in the supply channel 26 through the crop inlet 24 into the baling chamber 18.

After the loading fork 36a has brought the crop to be baled into the baling chamber 18, a provision can be made for the loading fork 36a or the tines 76 to remain in this position adjacent to the crop inlet 24, the loading fork 36a or tines 76 can close the inlet during the next pre compression cycle and are retracted during the next activation out of the supply channel 26 and brought into the aforementioned position facing away from the crop inlet 24, in order to be brought again immediately following into the supply channel 26. The crop inlet 24 can be closed during a compression cycle by any known means. For example, in the form of a pivoted fork and the loading fork assembly 36 is brought, after the conclusion of the loading process, into its position facing away from the crop inlet 24, whereupon the tines 76 do not enter the supply channel 26.

According to the present invention the loading fork assembly 36 can be provided with a sensor arrangement 80 that includes sensors is appropriate to determine the loading acting upon the loading fork assembly 36 or the loading fork 36a and the loading exerted by pre-compressed crop on the spring-loaded flap or means 38. The sensor arrangement 80 is effectively connected to an electronic data processing arrangement (DPU) and/or to a control or regulating arrangement (ECU) that is provided on the baler 10 or on a towing vehicle, not shown, which is connected or can be connected to the baler 10. The data processing arrangement (DPU) and/or the control and regulating arrangement (ECU) is provided with a display arrangement 82 or is connected or can be connected to such an arrangement.

The sensor arrangement 80 is particularly appropriate to determine a torsional load on the loading fork assembly 36 or the loading fork 36a about its or their longitudinal extent and thereby at least generally about the carrier 78. For this purpose the sensor arrangement 80 is configured to include as a sensor 86, particularly in the form of a torque or a torsional load sensor.

Using the torque measurements, the distribution of crop in the supply channel, particularly in regard to its width can be calculated. If the sensor 86 of the sensor arrangement 80 detects no torque, a small level of torque, or no torsional load, or only a small torsional load, then the harvested crop is distributed uniformly over the width of the supply channel 26. However, if a torsional load or a moment is detected in one direction (either to the right or the left with respect to the longitudinal axis of the vehicle or the extent of the length) then a larger amount of crop is located in the more highly loaded region or in the region in which the moment of the torsion is directed than in the opposite region or on the opposite side.

The sensor arrangement 80 delivers or transmits a corresponding value or corresponding values to the data processing arrangement DPU and the control or regulating arrangement ECU. It is conceivable, for example, to control or regulate automatically in such a way that the crop is uniformly taken up, for example, in that the towing vehicle or the baler 10 follows a mower swath more accurately. The regulating arrangement, for example, controls one or more functions of the baler 10 or the towing vehicle as a function of this or these values. An optical means may be provided, for example, on the towing vehicle or, particularly in the case of a self propelled baler on the baler itself which take up the distribution of the crop on the field that is to be processed and transmits it to the data processing arrangement (DPU) or to the control or regulating arrangement ECU for further processing. The values can be displayed to an operator directly or in a form processed by the data processing arrangement DPU by means of the display arrangement 82, so that the operator can make the direction of operation of the towing vehicle or the baler 10 conform or correct it.

The sensor arrangement 80 can also he used to detect the force applied to the loading fork assembly 36 or a pressure applied to the loading fork 36a. For this purpose, the sensor arrangement 80 includes a sensor 88 in the form of a strain gage can be applied to the transverse carrier 75 and the carrier 78 or regions of the loading fork assembly 36 to determine the deflection of the transverse carrier 75 or the carrier 78 from the applied force on the loading fork 36a or the loading fork assembly 36 in the vertical direction. The sensor 88 immediately transmits a value that corresponds to the applied load to the data processing arrangement DPU and the regulating arrangement. The sensor arrangement 80 can also sense what force the loading fork 36a or the loading fork assembly 36 experiences, across its width, from the harvested crop arranged in the supply channel 26 when it is moved into the baling chamber 18. This is accomplished by providing at least two pressure sensitive sensors 90 on the carrier 75 spaced at a distance from each other so that the crop or crop distribution relative to the width of the baler is represented by the difference of the values obtained.

On the basis of this force, conclusions can be drawn preferably by means of the data processing arrangement DPU as to the weight of the portion of harvested crop arranged in the supply channel and the amount of harvested crop conveyed by each stroke into the baling chamber. The data processing arrangement can also determine the weight of the finished bale or the bale being formed and evaluate these using a positioning system or a satellite supported GPS system. In addition, the control or regulating arrangement can control one or more functions of the baler 10 or of the towing vehicle such as the operating velocity of the towing vehicle. On the baler, for example, the function of the loading fork assembly, the frequency, (i.e., the spacing in time of the loading processes), the diameter or the volume of the supply channel, or other appropriate functions can be detected as desired.

According to another embodiment (see FIG. 3) it may also be provided that a sensor arrangement 80' comprises two sensors 92 respectively associated with two separate flap pieces 94, comprising the flap 38, which pivot as a function of the harvested crop present in the supply channel 26 and indicate that a desired density of the crop to be baled has been reached in the supply channel 26. Specifically, the two flap sections 94 are separately hinged on a rod extending beneath, the supply channel 26. Thus, the flap sections 94 can pivot independently from each other. Each of the flap sections 94 is spring loaded by a spring 96 coupled between an arm joined to an outer side of the associated flap section 94, with the springs resisting pivotal movement of the flap sections 94 caused by increasing density of the crop located in the supply channel 26. If a larger crop quantity is located on one side of the supply channel 26, the flap section 94 arranged in this area will pivot more strongly in this area than the other flap section 94. Each of the flap sections 94 acts together with the associated sensor 92, which supplies data that can be processed for example with the data processing arrangement (DPU).

The invention claimed is:

1. A baler, comprising:
   a baling chamber having a moveable baling piston;
   a supply channel having a supply assembly for conveying and compressing crop in the supply channel and for delivering the compressed crop into the chamber;
   a sensor assembly configured to detect the loading of the compressed crop on the baler and including at least first and second sensors to detect a distribution value of the harvested crop with respect to a width of the supply channel; and
   a flap defining a section of a bottom wall of, and extending said width of said supply channel; said flap having at least two parts provided in side-by-side relationship to each other across said bottom wall of the supply channel, each of the at least two parts pivoting independently of one another as a function of the harvested crop located in the supply channel and respectively interacting with said first and second sensors of the sensor assembly.

* * * * *